United States Patent
Ringness

(10) Patent No.: US 6,456,395 B1
(45) Date of Patent: Sep. 24, 2002

(54) METHOD FOR SEPARATING COLORS OF ENCAPSULATED POSTSCRIPT IMAGES

(75) Inventor: Edward H. Ringness, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/385,798

(22) Filed: Aug. 30, 1999

(51) Int. Cl.[7] .............................................. G06K 15/00
(52) U.S. Cl. ...................................... 358/1.9; 358/1.18
(58) Field of Search ................................ 358/1.15, 1.9, 358/1.1, 1.18

(56) References Cited

U.S. PATENT DOCUMENTS

| | | | | | |
|---|---|---|---|---|---|
| 5,454,069 A | * | 9/1995 | Knapp | ........................ | 395/120 |
| 5,581,667 A | * | 12/1996 | Bloomberg | ................ | 395/109 |
| 5,687,306 A | * | 11/1997 | Blank | ........................ | 395/135 |
| 5,729,704 A | * | 3/1998 | Stone | ........................ | 395/346 |
| 5,867,112 A | * | 2/1999 | Kost | ............................ | 341/51 |
| 6,091,518 A | * | 7/2000 | Anabuki | .................... | 358/500 |
| 2002/0003903 A1 | * | 1/2002 | Engeldrum | ................ | 382/233 |
| 2002/0011990 A1 | * | 1/2002 | Anwar | ...................... | 345/173 |

FOREIGN PATENT DOCUMENTS

JP             2-293922      * 12/1990    ........... G06F/15/21

* cited by examiner

Primary Examiner—Jerome Grant, II
(74) Attorney, Agent, or Firm—King & Spalding

(57) ABSTRACT

A method for color separating an image stored in an encapsulated POSTSCRIPT (EPS) file to be printed to a spot-color printing plate. The method is contained in a utility and referred to as "Encapsulated POSTCRIPT Color Separation" (ECS). The color separation of images in an EPS file is a two-step process. In the first step, the ECS utility determines whether the spot color appears in the electronic file. Typically, the named colors are listed in the document structuring convention ("DSC") comments of the header portion of the electronic file. If the DSC comment section contains a named color, then the ECS utility sets a key color to the named color. However, if the DSC comment section does not contain a named color, then the ECS defines the key color with the spot color defined by the DTP application. The ECS utility creates customized versions of the POSTSCRIPT language operators that define the colors of each object, and sends these customized versions to the POSTSCRIPT printer. The customized operators determine whether the object color associated with the object is a tint of the key color, as defined in the first step. If the ECS utility determines that the object color is a tint of the key color, the object is mapped to the spot-color partition and knocked-out on the black partition. However, if the object color is not a tint of the key color, the object is knocked-out on the spot-color partition and mapped to the black plate.

24 Claims, 8 Drawing Sheets

METHOD FOR SEPARATING COLORS OF ENCAPSULATED POSTSCRIPT IMAGES

TECHNICAL FIELD

This invention relates to the field of desktop publishing and, more particularly, relates to a software utility for separating colors into spot-color partitions used in encapsulated POSTSCRIPT images to create printing plates and screens for offset and other types of printing.

BACKGROUND OF THE INVENTION

Offset printing is a form of lithography in which ink is transferred from a plate containing the image to be printed on paper. The simplest and least expensive form of offset printing is black-and-white printing. Producing full-color reproductions of an image using offset and other printing processes is more complex and costly. To make full-color reproductions, a process known as, "color separation" is employed. For example, color separation for an offset printing process consists of creating four separate printing plates, one plate for printing each of four process colors, cyan, magenta, yellow, and black (CMYK). A full color image is created by blending layers of various sizes of half-tone dots in the process colors. Each plate is etched from a single-color negative known as a partition. Passing the image through a series of color filters typically performs color separation and then through a screen, creating the halftone partitions. Each halftone partition is then used to etch a positive image on an engraving plate, resulting in each printing plate containing the halftone dots for printing only one process color.

One variation of color printing is spot-color printing. In spot-color printing, a small number of "spot-color" inks, typically one or two, are used, often in combination with black ink to produce the image. Alternatively, one or more spot-color inks, in addition to the four process colors, and black ink, may be used to produce partitions to print the image. Each plate can contain varying levels of ink coverage using the halftone technique. Therefore, each plate can contain a range of tints of the plate color, varying from "white" (no color) to "solid" (full coverage). For example, objects in the image that are either black or gray are mapped to the black plate as either solid black or tints of black (gray). If only one spot color is used, the remaining objects may be mapped to the spot-color plate as a tint of the spot-color.

The advent of desktop publishing application programs ("DTP") and the POSTSCRIPT (a software convention) page-layout language simplified the production of commercial printing jobs using spot-color plates. Typically, most commercial printing jobs use the POSTSCRIPT page-layout language, manufactured by Adobe Systems, Inc. of San Jose, Calif., as an intermediate representation of the content of each plate. Typically, the DTP separates each color from the image and produces one POSTSCRIPT file for each spot-color plate. The resulting POSTSCRIPT files may be used as input to a variety of different processes and machines to produce a set of color-separated plates for use in offset and other printing presses.

Due to the popularity and ease of use of the POSTSCRIPT page page-layout language, it has become the printing industry standard. Furthermore, a variant, known as Encapsulated POSTSCRIPT ("EPS") evolved as a method of representing individual objects, such as a company logo, in a separate file that can be reproduced in a predictable way on all POSTSCRIPT output devices. For example, it may be of particular importance to print the COCO-COLA logo with the precise vibrant red that customers have come to associate with that product, regardless of the POSTSCRIPT output device used. Therefore, the COCO-COLA logo will typically be represented in an EPS file. Thus, regardless of the POSTSCRIPT device used to produce the color-separated plates, the COCO-COLA logo, along with the precise vibrant red color so well known to its customers, will always appear the same.

Normally when generating the POSTSCRIPT output, the DPT typically inserts the EPS file, which contains a specific object, such as the COCO-COLA logo, verbatim into the POSTSCRIPT output stream as a stand-alone piece of code. However, different EPS files are created by a variety of users with a variety of DTP application programs. Therefore, it is common for different objects in different EPS files that are intended to use the same color to have different named colors. For example, a POSTSCRIPT output stream may contain two distinct EPS files that contain the COCO-COLA logo. Although both files intend to print the COCO-COLA logo using the same vibrant red, one EPS file may use "PANTONE Red" to represent the vibrant red of the COCO-COLA logo, while the second EPS file may use "PANTONE Red 100." As a result, the DTP application program may not be able to determine that two colors, which have different names, are meant to be represented on the same spot-color plate. This leads to problems for DTP application programs in that the DTP application programs may not be able to determine all of the colors that the user intended to be represented on the same spot-color plate.

Typically, DTP application programs have attempted to solve this problem by requiring the user to specify which spot-color plate each object within the POSTSCRIPT output stream should be printed to. Using the example above, if the user intended that the COCO-COLA logo from each of the two separate EPS files should be printed to the same spot-color plate, the user must specify both the "PANTONE Red" and "PANTONE Red 100" should be printed to the "PANTONE Red" plate. For images containing a large number of objects in separate EPS files, this approach is time consuming for the user. Additionally, the user must have a high level of understanding of the POSTSCRIPT language and color separation to correctly modify the POSTSCRIPT output stream to place each object color on the correct spot-color plate. Furthermore, this can be a particularly confusing and tedious task, even for the most sophisticated user, because many times the name of the object colors are very close, but not identical.

Thus, there is a general need in the art for a more convenient and efficient method for mapping objects having object colors to the intended spot-color plate. There is a further need for a method for automatically separating and mapping objects having object colors in a separate EPS file to the intended spot-color plate.

SUMMARY OF THE INVENTION

The present invention meets the above-described needs in a software utility for separating object colors in an EPS file and mapping the objects to the appropriate spot-color partitions. Specifically, the encapsulated POSTSCRIPT Color Separation ("ECS") utility analyzes the colors used in an EPS file and generates POSTSCRIPT prologue and epilogue code for each EPS file. The prologue code sets the setcmykcolor and setrgbcolor operators in the POSTSCRIPT output device so that the object colors can be mapped as a tint of the spot-color to the spot-color partition. For those colors that cannot be mapped to the spot-color partition, the ECS utility "knocks out," or removes the object from the spot-color partition and maps the object to another partition.

Generally described, the ECS utility separates the colors of an image in an EPS file to be printed to a spot-color printing plate. The color separation of images in an EPS file is a two-step process. In the first step, the ECS utility determines whether the spot color appears in the EPS file. Typically, the colors used are listed in the document structuring conventions ("DSC") comments of the header portion of the EPS file. If the DSC comment section contains the spot color, then the ECS utility defines a key color equal to the colorimetric values of the spot color, as defined in the DSC comment section. Colorimetric values are the values of a calorimetric system that define the measurable properties of the color. For example, the most common calorimetric systems are the additive system, which uses the red, green and blue (RGB) calorimetric values, and the subtractive color systems, which uses cyan, magenta, yellow, and black (CMYK) calorimetric values. However, if the DSC comment section does not contain the spot color, then the ECS utility defines the key color equal to the colorimetric values of the spot color defined by the DTP application.

More specifically, the ECS utility performs an intelligent name matching technique to determine whether the named color located in the DSC comment section of the EPS file is "similar" to the spot color used in the DTP application program. Colors that are similar may have the same or very close colorimetric values but have different names. For example, the two colors "PANTONE 100 " and "PANTONE 100 CVC" have slightly different names but have the same calorimetric values. Because their names are slightly different, they may not be considered an exact match. Nevertheless, they are considered "similar" because their colorimetric values are the same or very close.

The ECS utility first determines whether the named color in the DSC comment section is a PANTONE color. If the named color is a PANTONE color, the ECS utility first compares the PANTONE color with the spot color to determine if they match exactly. If the two colors are an exact match, the ECS utility replaces the colorimetric values associated with the key color with the colorimetric values associated with the PANTONE color in the DSC comment section. However, if the two colors do not match exactly, the ECS utility determines whether the PANTONE color contains a suffix. If the PANTONE color name contains a suffix, the ECS utility removes the suffix and again compares the name of the PANTONE color in the DSC comment section to the spot color. If the PANTONE color exactly matches the spot color after the suffix is stripped, the ECS utility determines that the colors are "similar" and replaces the colorimetric values associated with the key color with the colorimetric values associated with the stripped PANTONE color. However, if the stripped PANTONE color does not match the spot color, the two colors are considered dissimilar and the ECS utility replaces the colorimetric values associated with the key color with the calorimetric values associated with the spot color used by the DTP application program.

Once the key color has been defined, the ECS utility proceeds to the second step. In this step, the ECS utility creates alternate versions of the POSTSCRIPT operators, which define the object colors. These alternate operators will be called within the POSTSCRIPT printer, in place of the standard operators. The alternate operators determine whether the object color is a tint of the key color. If the object color is a tint of the key color, the ECS alternate operators map the object color to the spot-color partition as the appropriate tint color. If the object color is not a tint of the key color, the ECS alternate operators "knock out" the object on the spot-color partition.

Similarly, for the black plate, the ECS utility creates a different set of alternate versions of the object-color operators. The black plate alternate operators determine whether an object color is a tint of any of the key colors for any of the spot colors, as defined in the first step. If the object color is a tint of any key color, the operator "knocks out" the color on the black plate. If the object color is not a tint of any key color, the ECS alternate operator maps the object to the black plate.

The ECS utility may further determine whether the object color associated with an object in the body section of the EPS file is a tint of the key color. The ECS utility first calculates the ratio of each calorimetric value associated with the object color to each colorimetric value associated with the key color. Typically, the ECS utility uses the subtractive, or CMYK calorimetric values to determine whether the object color is a tint of the key color. Therefore, since the calorimetric values of the object color may be stored using additive, or RGB colorimetric values, the ECS converts the additive colorimetric values of the object color to subtractive calorimetric values if necessary. The conversion step is accomplished by taking the complement value of each RGB colorimetric value. The complement colorimetric values (C, M, and Y) of the additive primary calorimetric values (R, G, and B) are calculated by subtracting the individual RGB values from a primary value. For example, in a computer display device using 256-colors, the maximum primary value is 255. Therefore, the complementary colorimetric values would be C=255-R,M=255-G,and Y=255-G.

After the ECS utility calculates the complementary colorimetric values of the object color, it calculates the ratio of each of the primary colorimetric values of the object color to the primary colorimetric values of the key color. That is, the ECS utility calculates the ratio of the cyan value in the object color to the cyan value of the key color, and the ratio of the magenta color value of the object color to the magenta color value of the key color, etc. Next, the ECS utility calculates the difference between each ratio and compares the difference to a predefined threshold value. If each difference is less than the predefined threshold value, the object color is considered a tint of the key color. A tint value is then calculated by taking the average value of the calculated complementary color value ratios.

The ECS utility may also generate POSTSCRIPT prologue code to send to a POSTSCRIPT output device before the EPS file is sent to the POSTSCRIPT output device. The prologue code sets a plurality of color variables used by the output device to key colorimetric values defined by the ECS in the first step. The output device uses color variables to print, or output objects using the appropriate color on the appropriate spot-color partition. Once the color variables are set in the output device, the ECS transmits the EPS file to the output device, which in turn outputs (e.g., displays on a display device, prints, etc.) the EPS file using the appropriate colors. Finally, after the EPS file is outputted, the ECS utility generates a POSTSCRIPT epilogue code and transmits the epilogue code to the output device to reset the color variables to their original values.

The invention also includes a method for making copies using the methods described above for the ECS utility, and another method for creating copies based on the partitions produced by the ECS utility. For example, printing plates may be created from the partitions and used to print copies of the image on an offset printing press. Similarly, silk screens may be created from the partitions and used to print copies of the image on a screen-printing machine. Other types of partitions and printing positives may also be created and used to make copies in accordance with the present invention. In sum, the invention includes an apparatus operable for carrying out the methods described above, and a computer-readable storage device for storing a set of computer-executable instructions for performing those methods.

That the invention improves over the drawbacks of spot color transformation systems and accomplishes the advantages described above will become apparent from the following detailed description of the exemplary embodiments and the appended drawings and claims.

DETAILED DESCRIPTION OF THE PREFERRED EMBODIMENTS

Figure 1:
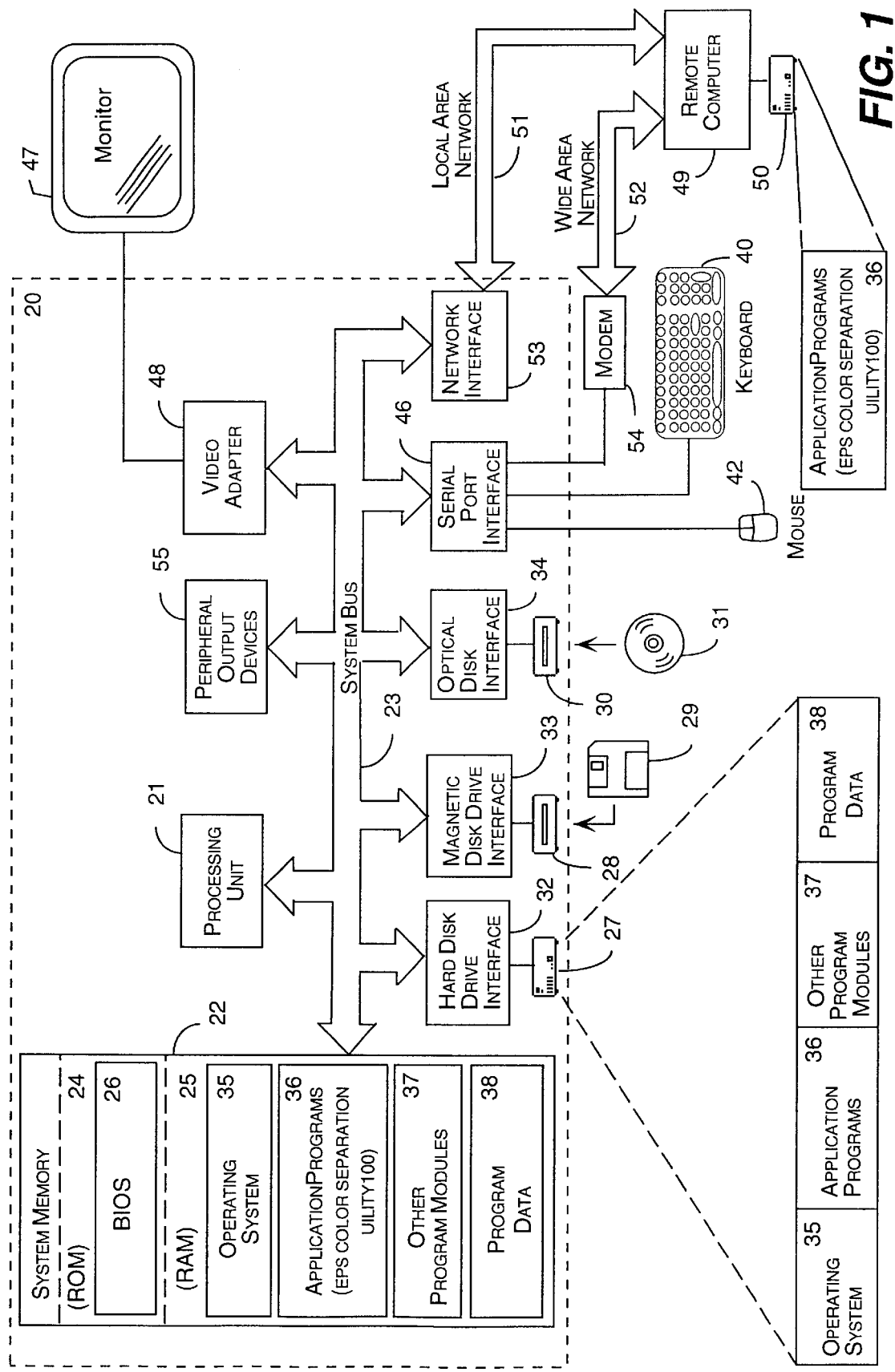
FIG. 1 is a block diagram of a personal computer that provides the operating environment for an embodiment of the present invention.

The present invention may be embodied in a software utility, which is referred to as the "EPS Color Separation" (ECS) utility. An embodiment of this utility is incorporated into a desktop publishing application program ("DTP") entitled "Publisher 2000," marketed by Microsoft Corporation of Redmond, Wash. The ECS utility automatically determines which object color from an encapsulated POSTSCRIPT ("EPS") file is mapped to the spot-color plate. In addition, the ECS utility automatically analyzes the colors associated with the objects in the EPS file and generates POSTSCRIPT prologue and epilogue code for each EPS file.

The term software "utility" typically denotes a software function, routine, or dynamic link library (DLL) that is configured as an independent object or module accessible by other software modules through a predefined set of interfaces. However, a "utility" within the meaning of this specification may also be incorporated into a computer operating system or application program, such as a desktop publishing application program. The invention therefore encompass any type of software module or system that performs the methods of the ECS utility described in this specification, and is not limited to a particular object configuration, such as a dynamic link library (DLL). Although the present invention is described in the context of a DTP publishing program, those skilled in the art will appreciate that the invention is applicable to other programs that display or allow a user to print images, such as word processing programs, presentation programs, drawing programs, computer aided design programs, and the like.

DTP application programs, such as Microsoft's Publisher 2000 output images and documents in POSTSCRIPT files when making commercial printing plates because most commercial printing jobs use the POSTSCRIPT page-layout language. These POSTSCRIPT files are then used as input for a POSTSCRIPT printer to produce a set of press-ready, color-separated printing plates. Although the present invention is described in terms of outputting images to a POSTSCRIPT printer, those skilled in the art will appreciate that the invention is capable of outputting the POSTSCRIPT files to other output devices and processes, all of which are capable of producing a set of press-ready printing plates.

Because POSTSCRIPT language has become an industry standard, a variant known as encapsulated POSTSCRIPT ("EPS") was invented to store individual page elements or images, so that the page elements could be reproduced in a predictable way on all POSTSCRIPT output devices. The EPS file is a self-contained chunk of POSTSCRIPT code which is inserted verbatim into the POSTSCRIPT output stream. Therefore, the EPS file is treated as a single object. For example, in Microsoft's Publisher 2000, EPS files are imported as Windows metafiles, through an external graphic import filter. Publisher 2000 then places the metafiles, along with the remaining page elements in a Z-order stack. Publisher 2000 retrieves an object from the Z-order stack, one-at-a-time, and passes the object to a graphic device interface ("GDI") driver, which interfaces with a POSTSCRIPT printer driver. The GDI then sends the object to the POSTSCRIPT printer driver to be printed on the appropriate press-ready plate. However, if the object is a Metafile, the DTP application program first determines whether the Metafile contains an EPS file. If the Metafile does not contain an EPS file the DTP application program simply passes the Metafile to the GDI, which makes the appropriate calls to the POSTSCRIPT printer driver to print the Metafile to the appropriate plate.

However, if the Metafile contains an EPS file, the DTP application program passes the EPS file to the ECS utility to color separate the objects in the EPS file so that they may be printed to the appropriate printing plate. The metafile optionally contains "preview records", which are GDI drawing records used to produce a preview of the EPS image on non-POSTSCRIPT devices, such as a computer display device.

All EPS files have a header portion and a body portion. The header portion contains file administration information, while the body portion contains individual data objects. For example, the header portion contains the Document Structuring Conventions ("DSC") comment section, which contains a list of the named colors that are used in the body portion of the EPS file. However, POSTCRIPT language does not support named colors. Therefore, the DSC comment section also contains the calorimetric values, such as the RGB and CMYK colorimetric values associated with each named color used in the body section of the EPS file. Each object in the body section of the EPS file is associated with a color represented by a set of calorimetric values in a color domain, usually the primary RGB calorimetric values.

However, the EPS file may also contain other types of colorimetric values, such the process colorimetric values cyan, magenta, yellow, and black (CYMK), the hue domain representing hue, saturation, and luminance (HSY), as well as named color domain, such as PANTONE colors. Those skilled in the art will appreciate that each type of colorimetric values may be transformed to the other types of colorimetric values. That is, a given RGB color value can be linearly transformed to an HSY color value, and can also be transformed to a CMYK color value based on the properties of the particular process inks.

When the ECS utility receives the EPS file from the DTP application program, the ECS utility scans the DSC comment section of the EPS file looking for the DSC comments that define the named colors associated with the EPS objects. The purpose of determining the named colors is to define the "key colors" that represent the spot-color partition in the EPS file. Typically, the key colors are either a RGB or a CMYK calorimetric value that is the "key" representing one partition's spot-color ink in the EPS file. The key color is used as the basis for comparisons in the redefined POSTSCRIPT color operators that he ECS inserts in the POSTSCRIPT stream as prologue code. Any object in the EPS file having a color matching the key color will be considered 100% of the spot-color ink, and any object that has a color "similar" to the key color will be considered a tint of the spot-color ink. For those object that have colors that are greater than 100% tints of the key color will be treated as 100% tints of the spot.

Depending on how the spot color is defined in the DTP application program and how it is defined in the EPS file (i.e., as a named color, an RGB color, or a CMYK color), the ECS utility may use one key color (RGB or CMYK), or two key colors (both RGB and CMYK) when color separating objects in the EPS file. If the spot color is defined as a named color in the DTP application program, then both the RGB and CMYK calorimetric values for that particular spot color are also known since a standard color is defined by the additive colorimetric values. However, if the spot color is defined only using the RGB or CMYK colorimetric values, then only the corresponding key color is known and the remaining key color is left undefined. If a spot color is a named color, such as PANTONE, then the ECS utility scans the header portion of the EPS file to determine if the same PANTONE color name is used by any objects in the EPS file. The methods of comparing the color associated with the object to the spot color depends upon which color space is used to represent the spot color and the object color. The methods the ECS utility uses to compare the spot color to the associated named color are summarized below in the Table 1:

TABLE 1

Comparison methods for different color spaces.

| Spot Color type | Named Color RGB value? | Named Color CMYK value? | Comparison Method |
|---|---|---|---|
| PANTONE | N/A | N/A | Compare the PANTONE color name of the object color with the PANTONE color name of the spot color. |
| RGB | Yes | N/A | Use RGB values of the color associated with the object. |
| RGB | No | Yes | Convert the object CMYK color values to RGB colorimetric values. |

TABLE 1-continued

Comparison methods for different color spaces.

| Spot Color type | Named Color RGB value? | Named Color CMYK value? | Comparison Method |
|---|---|---|---|
| CMYK | N/A | Yes | Use the object CMYK colorimetric values. |
| CMYK | Yes | No | Convert object RGB colorimetric values to CMYK colorimetric values. |

For example, if the spot color is a PANTONE color having the specific name PANTONE 100, the ECS utility examines the color variables, specifically the three variables DocumentCustomColors, CMYKCustomColors, and RGBCustomColors values in the DSC comments section of the of the EPS header to determine whether the exact name (PANTONE 100) is stored in any one of these color variable. If the ECS utility determines that value of one the color variables matches the name of the PANTONE color, the ECS utility retrieves the corresponding CMYK and RGB values associated with that particular PANTONE color and sets the CMYK key color to the value of the CMYKCustomColors variable. Similarly, the ECS utility sets the RGB key color to the values found in the RGBCustomColors variable.

However, if the ECS utility determines that the spot color PANTONE name does not match any of the color variables in the DSC comment section, then the ECS utility applies an intelligent matching algorithm to determine whether the two colors are "similar". To determine whether two colors are similar, the ECS utility first strips off any suffixes from the PANTONE color names contained in the DSC comment section. Next, the ECS utility compares the stripped PANTONE color name with the spot color PANTONE name. If the two PANTONE color names match after the suffixes are removed, then the two colors are considered similar. For example, if the PANTONE color stored in the key color definition is "REFLEX BLUE 100" and the PANTONE color defined in the DSC comment section is a custom color, such as "REFLEX BLUE 100 CVC," which is almost identical to "REFLEX BLUE 100," the ECS utility would first determine that the two PANTONE colors do not match because the names are not identical. Since the two PANTONE color do not match exactly, the ECS utility then removes the suffix "CVC" from the color name stored in the DSC comment section and compares the two names again. Because the two PANTONE color names now match, the two colors are considered to be similar. Therefore, the ECS utility sets the RGB key calorimetric values and the CMYK key colorimetric values to the RGB and CMYK calorimetric values of the stripped PANTONE color name.

However, if the stripped PANTONE name and the spot color PANTONE name still do not match, the ECS utility considers the two colors to be different. In this case the ECS utility set the values of the key colors to the same RGB and CMYK calorimetric values that define the spot color in the DTP application program. The instances in which the RGB key color or the CMYK color is set and the values the ECS utility assigns to them are summarized in Table 2.

TABLE 2

Key Color Determination

| Spot Color Type | Spot color name in Document CustomColors variable? | EPS file lists spot color in RGB CustomColors variable? | EPS file lists spot color in CMYK CustomColors variable? | RGB Key Color | CMYK Key Color |
|---|---|---|---|---|---|
| RGB Color | N/A | N/A | N/A | RGB value | Undefined |
| CMYK Color | N/A | N/A | N/A | Undefined | CMYK value |
| PANTONE | No | N/A | N/A | Undefined/Knock out | Undefined/Knock out |
| PANTONE | Yes | No | N/A | Spot PANTONE RGB | N/A |
| PANTONE | Yes | Yes | N/A | EPS file's RGB Custom Color RGB | N/A |
| PANTONE | Yes | N/A | No | N/A | Spot PANTONE CMYK |
| PANTONE | Yes | N/A | Yes | N/A | EPS file's CMYK Custom Color CMYK |

Once the ECS utility defines the key colors by setting either the RGB or CMYK color key, the ECS utility generates POSTSCRIPT prologue code to redefine certain POSTSCRIPT language operators, which define the colors to use for printing an image using a POSTSCRIPT printer. Specifically, the ECS utility redefines the setcmykcolor and setrgbcolor variables used by the POSTSCRIPT printer. The redefined variables are then used to determine whether the color associated with each object is a tint of the key color.

The ECS utility first determines whether the CMYK key color was previously defined. If the CMYK key color was previously defined, then the ECS utility determines whether the CMYK value of the object is a tint of the key color. To determine whether the color of the object is a tint of the key color, the ECS utility calculates the ratio of the object color to the key color for each color value using the formulas:

$$R_{cyan} = cyan_{object\ color}/cyan_{key\ color}$$

$$R_{magenta} = magenta_{object\ color}/magenta_{key\ color}$$

$$R_{yellow} = yellow_{object\ color}/yellow_{key\ color}$$

$$R_{black} = black_{object\ color}/black_{key\ color}$$

where ($cyan_{object\ color}$, $magenta_{object\ color}$, $yellow_{object\ color}$, $black_{object\ color}$) and ($cyan_{key\ color}$, $magenta_{key\ color}$, $yellow_{key\ color}$, $black_{key\ color}$) are the CMYK calorimetric values of the object color and the key color, respectively.

Next, the ECS calculates the absolute difference between each of the ratios: $|R_{cyan}-R_{magenta}|$, $|R_{cyan}-R_{yellow}|$, $|R_{cyan}-R_{black}|$, $|R_{magenta}-R_{yellow}|$, $|R_{magenta}-R_{black}|$, and $|R_{yellow}-R_{black}|$. Once the differences are calculated, the ECS utility compares them to a predefined threshold. If each difference is less than the predefined threshold, then the object color is considered a tint of the spot color. However, if one difference is greater than the predefined threshold, then the object color is not considered a tint of the spot color. For example, the CMYK colorimetric values of the object color may be defined as (100, 100, 75, 75), the CMYK colorimetric values of the key color may be defined as (100, 100, 76, 78), and the predefined threshold value may be defined as 0.05, the ratios would be (1, 1, 0.98, 0.96). The absolute differences would be (0, 0.02, 0.04, 0.02, 0.04, and 0.02). Because the difference between each of the individual calorimetric values is less than the predefined threshold, the object color is a tint of the key color.

After the ECS determines that the object color is a tint of the key color, the next step is to determine what percent tint of the key color the object color is. The percent tint is calculated by simply averaging the four ratios using the following formula:

$$\% \text{ tint} = (R_{cyan} + R_{magenta} + R_{yellow} + R_{black})/4$$

Thus, in the above example, the percent tint is 98.5% ([1+1+0.98+0.96]/4).

Once the percent tint is calculated, the object is mapped to the spot color partition as the calculated percent tint of the spot color by redefining the setcmykcolor variable to map the object as a gray scale of the spot color to the spot-color partition. The ECS utility also resets the setcmykcolor variable on the black partition to display the CMYK colorimetric values as all white (0, 0, 0, 0), which effectively knocks out the object on the black partition.

However, if the ECS utility determines that the object color is not a tint of the key color, the ECS utility knocks out the object from the spot-color partition by resetting the setcmykcolor variable to display each CMYK value of the object on the spot-color partition as white (0, 0, 0, 0). The setcmykcolor variable is left unchanged for the black partition, which allows the object to be mapped to the black partition as a tint of gray.

After the ECS utility sets the setcmykcolor and setrgbcolor variables to the appropriate values in the prologue code, the ECS utility inputs the prologue code into the POSTSCRIPT output stream immediately prior to the EPS file. This allows for the POSTSCRIPT printer to determine which object colors in the EPS file are tints of the spot color. Finally, the ECS utility creates an epilogue POSTSCRIPT code, which resets the setcmykcolor and the setrgbcolor variables to their original values. The ECS utility inserts the epilogue code into POSTSCRIPT output stream immediately following the EPS file.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices 55, such as printers or speakers. For example, a POSTSCRIPT printer may be connected the personal computer through a POSTSCRIPT printer driver.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
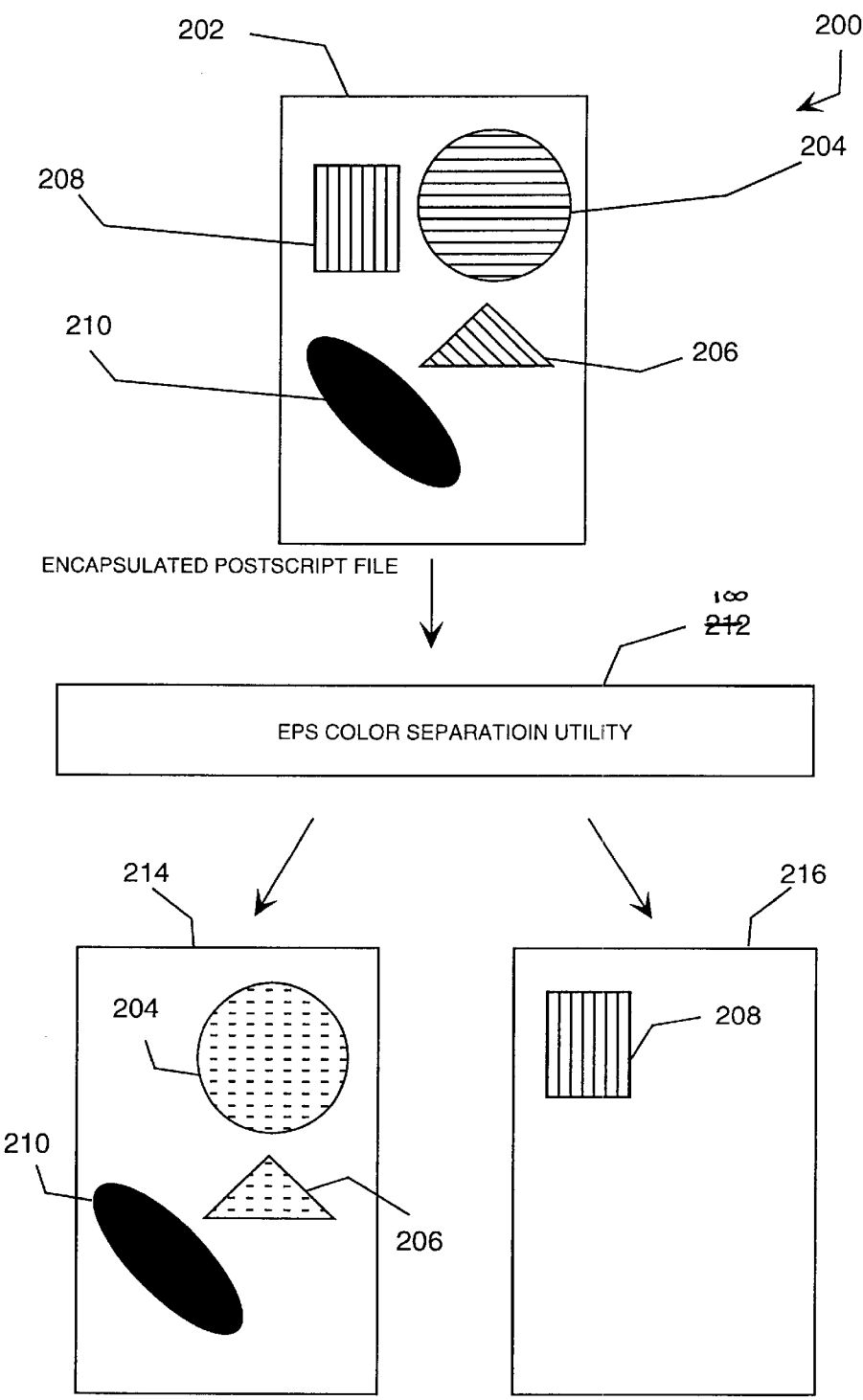
FIG. 2 is an illustration of the ECS utility mapping objects within an EPS file having object colors into color-separated POSTSCRIPT files.

FIG. 2 is an illustration of how the invention color separates objects from an EPS file 202. The EPS file 202 includes several objects: a blue-colored circle 204, a green-color triangle 206, a red-colored rectangle 208, and a black-color oval 210. Typically, the colors used for the objects contained within the EPS file 202 are named colors, that is they are identified by a text name, such as "REFLEX blue," "PANTONE 100 CVC," "PANTONE red," or the like. As the EPS file 202 passes through the ECS utility 100, it maps the red-color rectangle 208 to a red spot-color partition 216 because the red-colored rectangle either exactly matches or is similar to the red spot-color. The remaining objects, whose colors are not similar to the red spot-color (i.e., the blue-colored circle 204, the green-color triangle 206, and a black-color oval 210) are mapped to the black partition 214 as either black or tints of black (i.e., gray).

Figure 3:
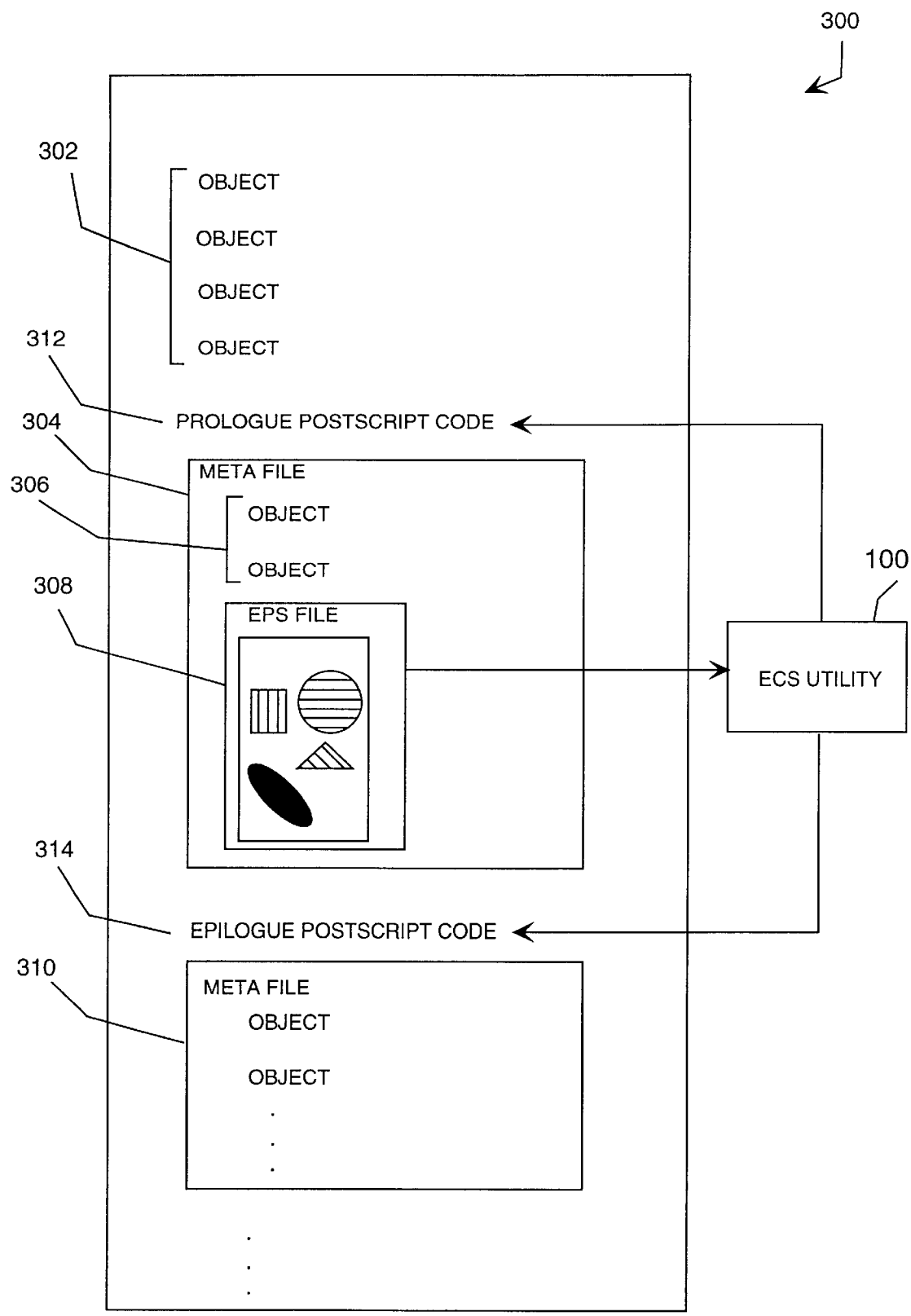
FIG. 3 is an illustration of a typical Z-ordered stack.

FIG. 3 is an illustration how the ECS utility 100 retrieves and interacts with the Z-ordered stack 300 generated by the DTP application program. The Z-ordered stack 300 may contain both objects 302 and metafiles 304, 310. The metafile 304, in turn may itself contain objects 306 and/or EPS files 202. When the DTP application program encounters a metafile 304 that contains an EPS file 202, the DTP application program pass the EPS file 202 to the ECS utility 100. The ECS utility 100 color-separates the objects, generates a prologue POSTSCRIPT code 312 and places the prologue POSTSCRIPT code 312 in the Z-ordered stack immediately preceding the EPS file 202. The prologue POSTSCRIPT code redefines several color variables used by a POSTSCRIPT printer to print the color-separated objects of the EPS file 202 to the appropriate spot-color plates.

The ECS utility 100 then generates an epilogue POSTSCRIPT code 314 and places it in the Z-ordered stack immediately following the EPS file 202. The epilogue POSTSCRIPT code 314 resets the color variables in the POSTSCRIPT printer to their original values to print the remaining object 302 and metafiles 304 to the appropriate spot-color plates. The process of generating a prologue POSTSCRIPT code 312 and epilogue POSTSCRIPT code 314 is repeated each time that the DTP application program encounters a metafile containing an EPS file 202.

Figure 4:
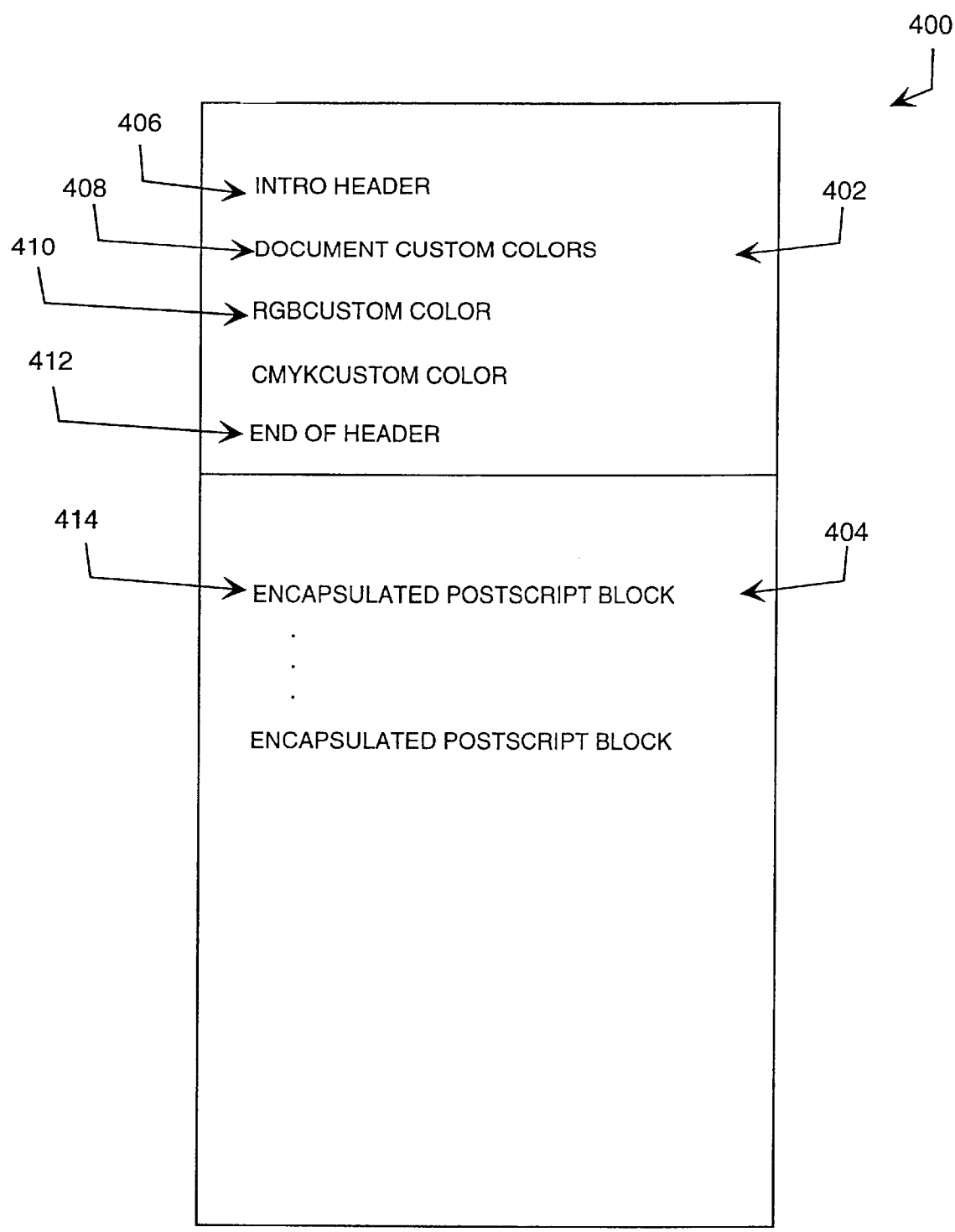
FIG. 4 is an illustration of a prior art EPS file structure.

FIG. 4 is a prior art drawing illustrating the format of an EPS file 202. The EPS file 202 includes a header portion 402 and a body portion 404. The header portion 402 contains DSC comments, which include a header intro 406, which signals the beginning of the header portion 402, a Document Custom Color list 408 that identifies each color used by an object in the EPS file 202, a RGB Custom Color and a CMYK Custom Color list 410 that identify the additive and subtractive calorimetric values for the each color, and an End of Header marker 412 that signals the end of the header portion 402. The body portion 404 contains the individual objects, known as encapsulated POSTSCRIPT blocks 414, which contain the content data of the EPS file. As an example, if the EPS file 202, contained the COCA-COLA logo, the letters and the distinctive swirl of the mark would be contained in individual EPS blocks within the body portion 404. The name of the distinctive red ink would be stored in the Document Custom Color list 408, and the corresponding RGB and CMYK calorimetric values would be stored in the RGB Custom Color and a CMYK Custom Color list 410 of the DSC comments in the header portion 402. This standard format allows a variety of POSTSCRIPT output devices to accurately reproduce the COCA-COLA logo in a predictable and consistent manner.

Figure 5:
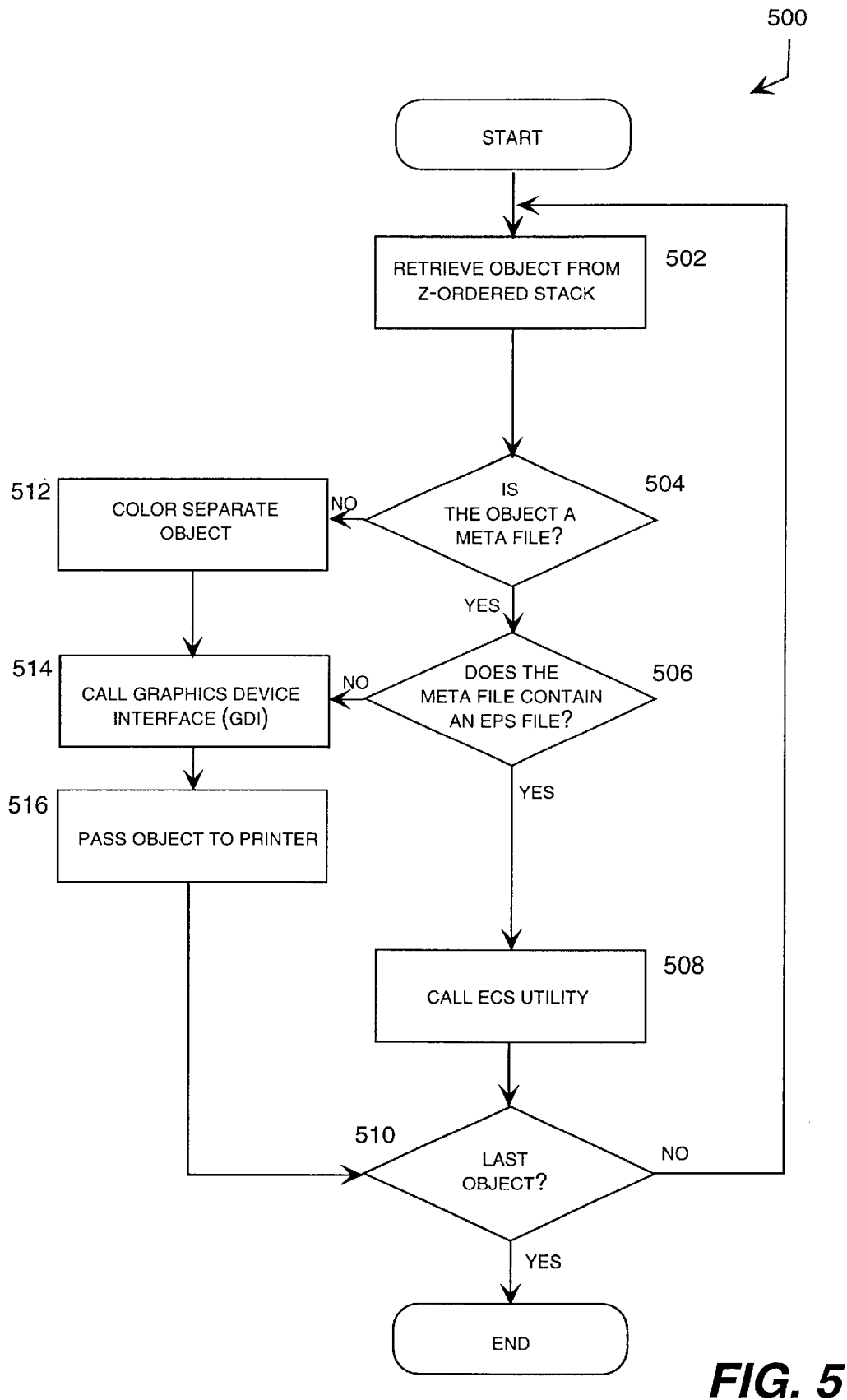
FIG. 5 is a logic flow diagram illustrating an exemplary technique for applying EPS utility to a file in a desktop application program.

FIG. 5 is a logic flow diagram of routine 500 illustrating routine how a DTP application program interacts with the ECS utility 100. Routine 500 begins at step 502, in which the DTP application program retrieves an object 306 from the Z-ordered stack 300. Step 502 is followed by step 504, in which the DTP application program determines whether the object contains a metafile. If the object contains a metafile, routine 500 proceeds along the "YES" branch to step 506, in which the DTP makes a further determination whether the metafile contain an EPS file 202. If the metafile contains an EPS file 202, the "YES" branch is followed to step 508, in which the DTP application program passes the EPS file 202 to the ECS utility 100 to color-separate the images.

Step 508 is followed by step 510, in which the DTP application program determines whether the retrieved object was the last object in the Z-ordered stack 300. If the determination is made that the last object was retrieved, the "YES" branch is followed to the "END" step. However, if the determination is made that more objects remain in the Z-ordered stack, the "NO" branch loops back to step 502 to retrieve the next object and begin the process again.

Returning to step 506, if the determination is made that the metafile does not contain an EPS file 202, the "NO" branch is followed to step 514, in which the DTP application program calls a graphics device interface (GDI), which formats the metafile for printing to a POSTSCRIPT printer. Step 514 is followed by step 516, in which the GDI passes the formatted metafile to a POSTSCRIPT printer driver to be printed. Once the metafile passes to POSTSCRIPT printer driver, routine 500 proceeds to step 510 to determine whether the Z-ordered stack contains any more objects.

Finally, returning to step 504, if the DTP application program determines that the retrieved object does not contain a metafile, routine 500 follows the "NO" branch to step 512, in which the DTP application color separates the object and maps it to the appropriate partition using well known techniques. Step 512 is followed by step 514, in which a call is made to the GDI to format the color-separated image for printing to a POSTSCRIPT printer. Finally, step 514 is followed by step 516, in which the GDI passes the object to the printer.

Figure 6:
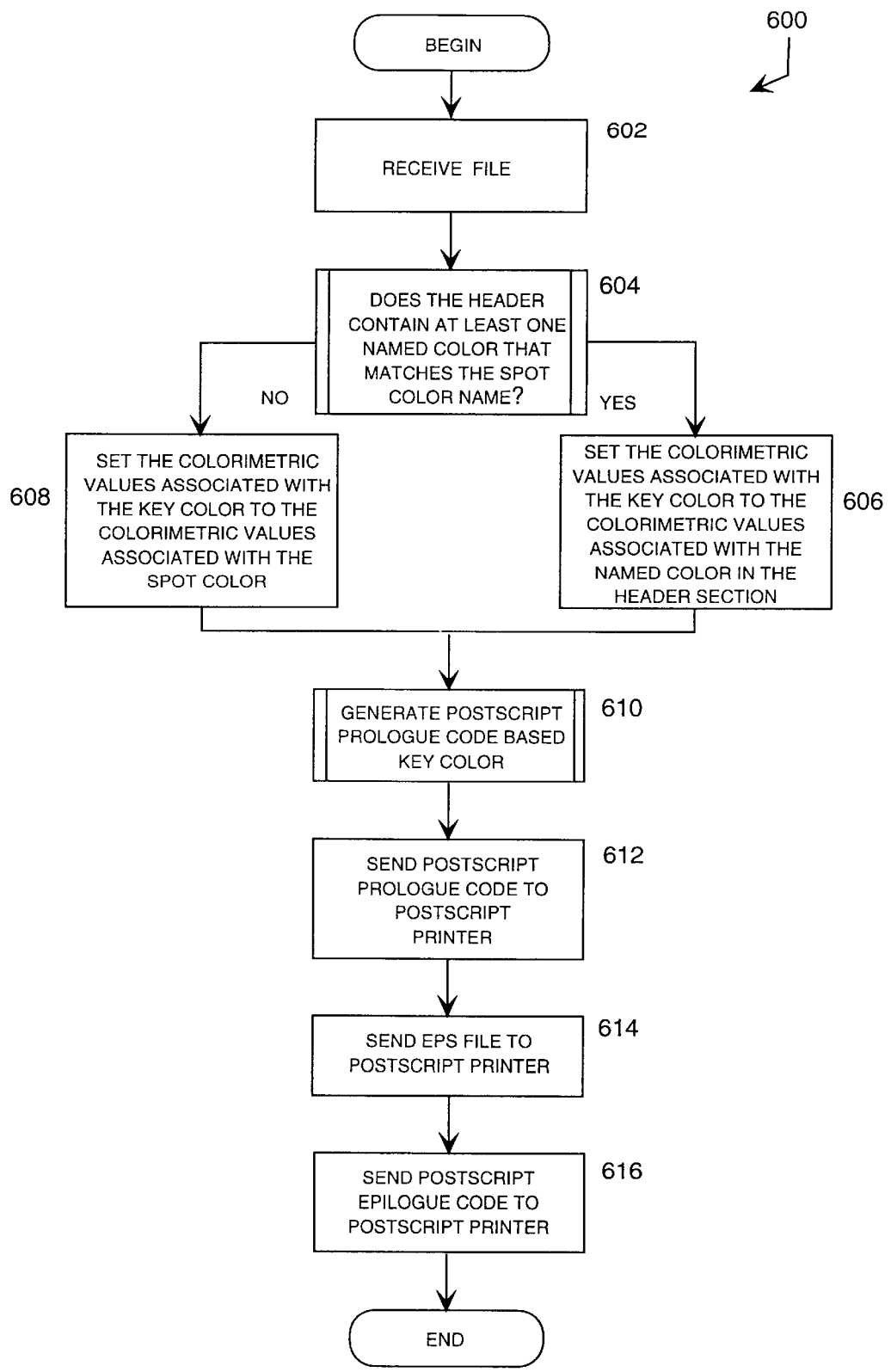
FIG. 6 is a logic flow diagram illustrating a method of color-separating objects in an EPS file within a desktop publishing application program.

FIG. 6 is a logic flow diagram illustrating routine 600 for applying the operation of the ECS utility 100 to a EPS file 202 used in a desktop publishing computer program. Those skilled in the art will appreciate that the logic flow diagram of FIG. 6 is executed by the processing unit 21 in response to instructions that have been incorporated into the ECS utility 100.

The routine 600 begins at step 602, in which the Encapsulated POSTSCRIPT Color Separation utility 100 receives an EPS file 202 from the POSTSCRIPT output stream 300. Step 602 is followed by step 604, in which the ECS utility 100 determines whether the header portion 204 of the EPS file 202 contains at least one named color. To do so, the ECS utility 100 looks in the DSC comment section 408 of the header portion of the EPS file 202. If the EPS file 202 contains at least one named color matching the name of the spot color defined in the DTP application, the routine follows the "YES" branch to step 606. In step 606, the ECS utility 100 sets the calorimetric values associated with the key color to the calorimetric values associated with named color listed in the DSC comment section 408. A key color is defined by either the RGB colorimetric values, the CMYK calorimetric values, or both that represent a spot color in the EPS file 202. Depending on how the spot color is defined in Publisher, and (in the case of PANTONE) how it is defined in the EPS file 202, the ECS utility 100 may use one key color (RGB or CMYK), or two key colors (both RGB and CMYK) when separating an EPS file 202.

Returning to step 604, if the ECS utility 100 makes the determination that the EPS file does not contain a named color matching the spot color name defined in the DTP application, the "NO" branch is followed to step 608, in which the ECS utility 100 sets the calorimetric values of the key color to the calorimetric values of the spot color defined in the desktop publishing application program.

Once the ECS utility 100 sets the key calorimetric values, step 600 is followed by routine 610, in which the ECS utility 100 generates a POSTSCRIPT prologue code to redefine the calorimetric values in the POSTSCRIPT output device used to output the object. Additionally, the POSTSCRIPT prologue code contains an algorithm that determines whether the object in the EPS file are tints of the spot color, which is described in detail below with reference to FIG. 8. Once the ECS utility 100 POSTSCRIPT prologue code and forwards it to the POSTSCRIPT output device, step 610 is followed by step 612, in which the ECS utility 100 sends the object with included EPS file 220 to the POSTSCRIPT output device. The POSTSCRIPT printer then may print the objects within the EPS file 220 using the redefined RGB and CMYK colorimetric values to the appropriate spot-color plates.

Step 612 is followed by step 614, in which the ECS utility 100 generates a POSTSCRIPT epilogue code, which resets the RGB and CMYK calorimetric values in the POSTSCRIPT output device to their original values. Step 614 is followed by step 616, in which the ECS utility 100 sends the epilogue code to the POSTSCRIPT printer. Finally, step 616 is followed by the "END" step.

Figure 7:
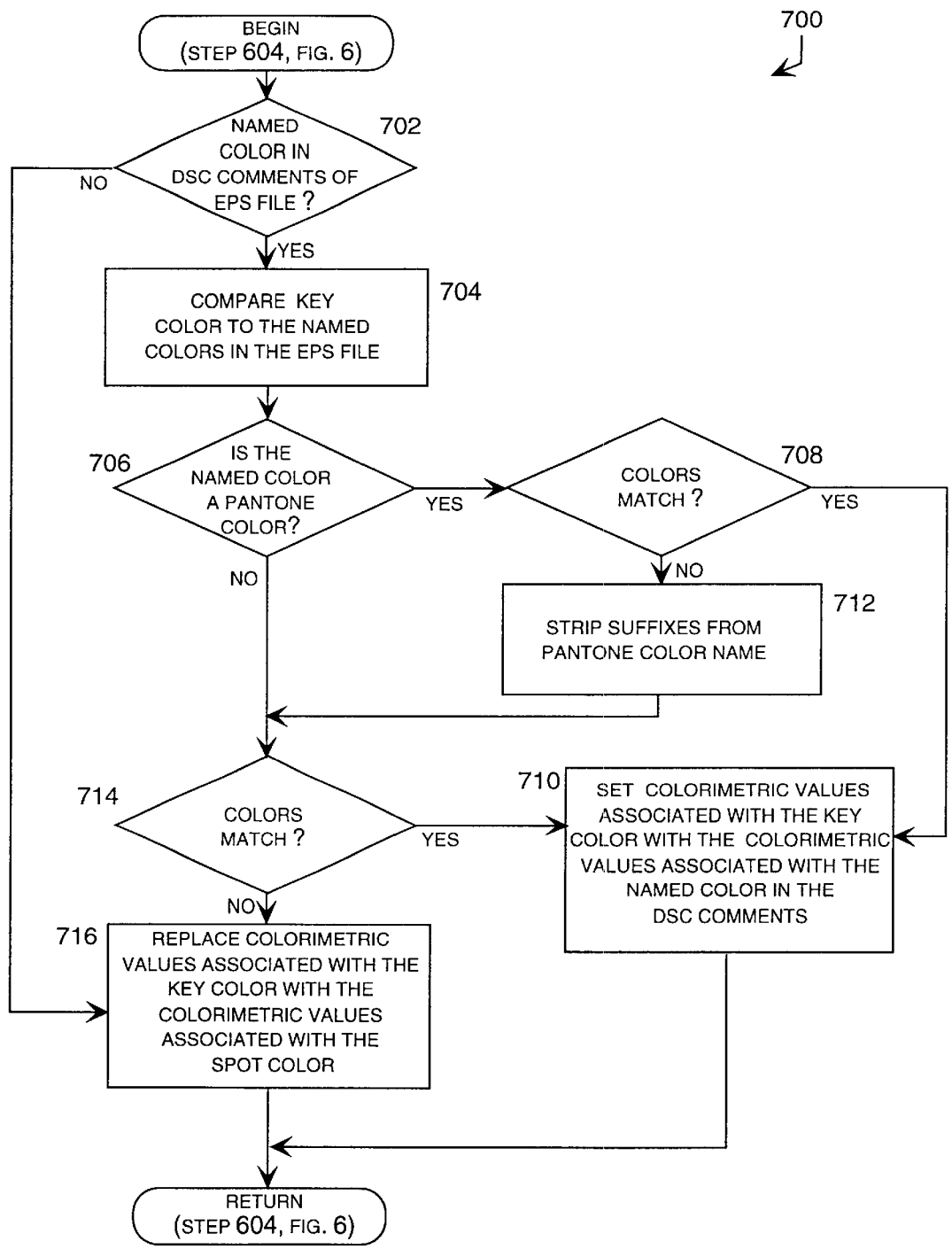
FIG. 7 is a logic flow diagram illustrating a technique for determining whether the color associated with an object is an exact match of or is similar to the spot color.

FIG. 7 is a logic flow diagram illustrating routine 700, in which the ECS utility 100 determines whether the color associated with the object is similar to the spot color defined in the DTP application program. Routine 700 begins at step 702, in which the ECS utility 100 determines whether a named color is listed in the DSC comments section of the EPS file. If a named color appears in the DSC comments section of the EPS file 202, the "YES" branch is followed to step 704, in which the ECS utility 100 compares the key color to the named colors listed in the EPS file 202. The method of comparing the named color to the spot color depends upon which color space is used to represent the spot color. Specifically, the methods used by the ECS utility 100 to compare the spot color and the named color are summarized above in Table 1. For example, if the spot color is a named color, such as PANTONE, the ECS utility 100 compares the named color with the PANTONE color name of the spot color. Alternatively, if the spot color is defined in RGB color space and the object color is defined in CMYK color space, the ECS utility 100 first converts the named color to equivalent CMYK calorimetric values to RGB calorimetric values and compares the RGB calorimetric values to the RGB or CMYK colorimetric values of the spot color.

Step 704 is followed by step 706, in which the ECS utility 100 determines whether the named color is a PANTONE color. If the spot color is a PANTONE color then the "YES" branch is followed to step 708, in which the ECS utility 100 further determines whether the spot color matches the named color. The determination is made by performing a text string comparison of the spot color's PANTONE name with the named color's PANTONE name. For example, if the spot color is "PANTONE 100" and the objects color is also "PANTONE 100," the names would match exactly. However, if the spot color is "PANTONE 100" and the object color is "PANTONE 100 CVC," the two color names are not an exact match because the object color name contains the additional suffix "CVC."

If the determination is made that the two PANTONE color names match exactly, the "YES" branch is followed to step 710 in which the ECS utility sets the colorimetric values associated with the key color to the colorimetric values of the named PANTONE color that are contained in the DSC comment section 308 of the EPS file 202. Step 710 is followed by the "RETURN" step, which returns to step 604 of routine 600.

Returning to step 708, if the PANTONE color name of the key color does not match the PANTONE name of the named color contained in the EPS file 202, the "NO" branch is followed to step 712, in which the ECS utility 100 performs an "intelligent" matching algorithm. The intelligent matching algorithm determines whether the PANTONE color is "similar" to the PANTONE color stored in the key color. The ECS utility begins the intelligent matching algorithm by removing any suffixes from the named color's PANTONE name stored in the EPS file 202. Once the suffixes are removed, the routine 700 proceeds to step 714, in which the ECS utility 100 compares the PANTONE color name of the key color with the "stripped" PANTONE color name. If the names match, the two PANTONE colors are considered to be similar and the routine proceeds to step 710, in which the colorimetric values associated with the key calorimetric values are set to the colorimetric values associated with the stripped PANTONE color contained in the DSC comment section.

As an example of the intelligent matching algorithm, the PANTONE color stored in the key color definition may be "REFLEX BLUE 100" and the PANTONE color defined in the EPS file 202 may be a custom color, such as "REFLEX BLUE 100 CVC," which is similar to "REFLEX BLUE 100." Because the two colors are similar, it is desirable to place both colors on the same color partition. However, because the two names are not identical, the ECS utility 100 would determine that the two PANTONE colors do not match and place the two colors on separate partitions, which is undesirable. Therefore, the ECS utility 100 strips away the suffix "CVC" from the color name stored in the DSC comment section 308 of the EPS file 202 and compares the two names again. Because the two PANTONE color names now match, the two colors are considered to be identical and the ECS utility sets the key calorimetric values to the colorimetric values of the stripped PANTONE color name so that the color is mapped to the appropriate partition.

Returning to step 714, if the stripped PANTONE color does not match the PANTONE color name stored in the key color value, the "NO" branch is followed to step 716, in which the colorimetric values associated with the key color are replaced with the colorimetric values associated with the spot color used by the desktop publishing application program. Setting the calorimetric values associated with the key color to the colorimetric values associated with the spot calorimetric values allows the POSTSCTIPT printer to use the spot color to determine whether a color should be mapped to the spot color partition or whether the color should be knocked out on the spot color partition and mapped to the black partition.

Finally, step 716 is followed by the "RETURN" step, which returns to step 604 of routine 600.

Figure 8:
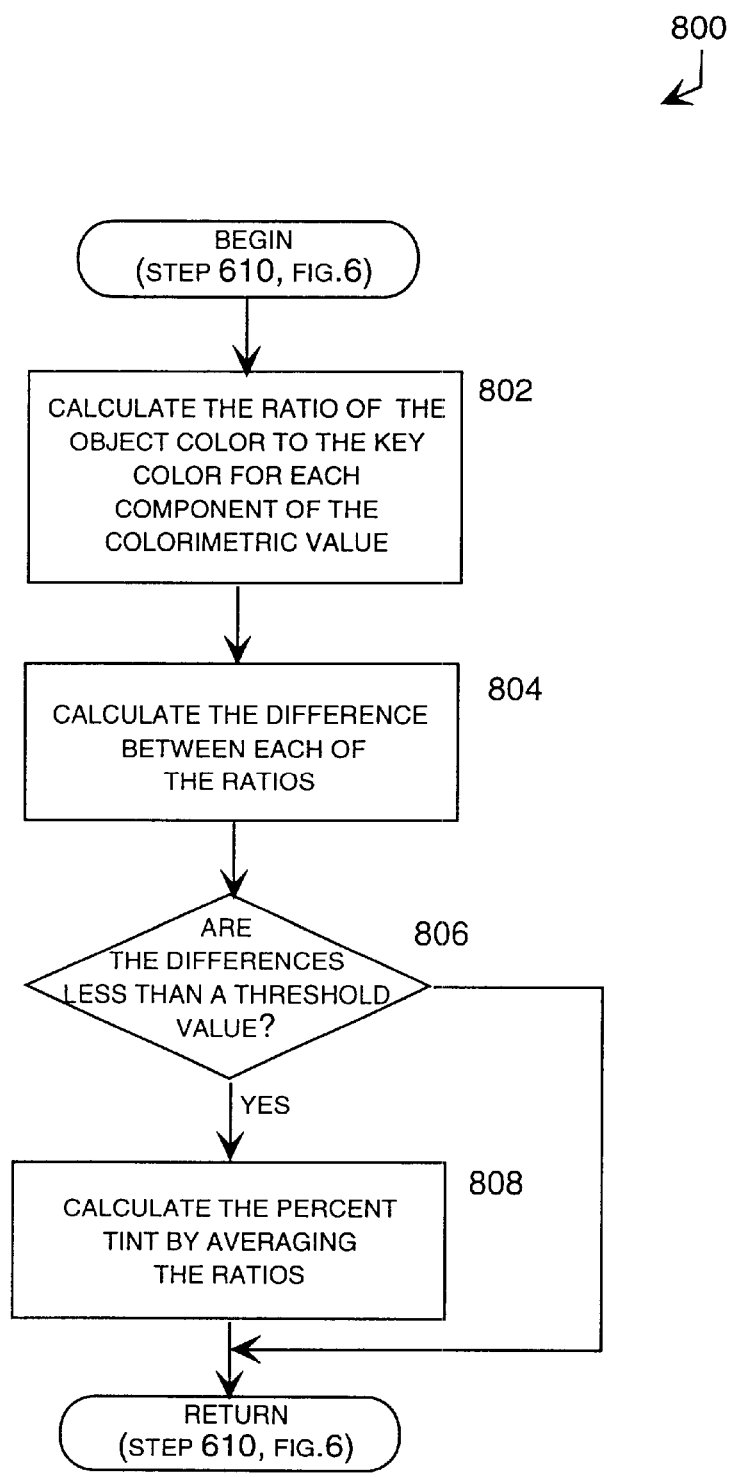
FIG. 8 is a logic flow diagram illustrating a technique for determining whether the color associated with an object is a tint of the spot color.

FIG. 8 is a logical flow diagram illustrating routine 800 from step 610 from FIG. 6, in which the POSTSCRIPT prologue code generated by the ECS utility 100 determines whether the color associated with the object is a tint of the spot color. Routine 800 begins at step 802 in which the ECS utility 100 calculates the ratios of the object color in the PostScript body section 308 to the key color for each calorimetric value. Because tinting is a subtractive color operation, the calorimetric values of both the object color and the key color are first converted to the subtractive color space if required. For example, if the object color and the key color were a PANTONE color, the CMYK colorimetric values would be retrieved.

In the case where only the additive RGB colorimetric values exist, the additive calorimetric values are converted to their subtractive CMYK equivalents. The conversion from additive to subtractive calorimetric values is calculated by subtracting the RGB values from a maximum primary value. The complement colorimetric values (C, M, and Y) of the additive primary colorimetric values (R, G, and B) are calculated by subtracting the individual RGB values from a primary value. For example, in a computer display device using 256-colors, the maximum primary value is 255. Therefore, the complementary calorimetric values would be C=255-R, M=255-G, and Y=255-G.

Once the ECS utility determines the subtractive calorimetric values, the ESC utility calculates a ratio of the object color to the key color for each CMYK colorimetric value using the formula:

$R_{cyan} = cyan_{object\ color}/cyan_{key\ color}$ $R_{magenta} = magenta_{object\ color}/magenta_{key\ color}$ $R_{yellow} = yellow_{object\ color}/yellow_{key\ color}$ $R_{black} = black_{object\ color}/black_{key\ color}$ where ($cyan_{object\ color}$, $magenta_{object\ color}$, $yellow_{object\ color}$) and ($cyan_{key\ color}$, $magenta_{key\ color}$, $yellow_{key\ color}$) are the CMYK calorimetric values of the object color and the key color respectively.

Step 802 is followed by step 804, in which the ECS calculates the absolute difference between each of the ratios: $|R_{cyan}-R_{magenta}|$, $|R_{cyan}-R_{yellow}|$, $|R_{cyan}-R_{black}|$, $|R_{magenta}-R_{yellow}|$, $|R_{magenta}-R_{black}|$, and $|R_{yellow}-R_{black}|$. For example, the predefined threshold value may be defined as 0.01, which requires each difference to be less than 1%.

Once each of the differences are calculated, the routine 800 proceeds to step 806, in which the determination is made whether each difference is less than the predefined threshold. If each of the differences are less than the predefined threshold value, the object color is determined to be a tint of the key color and the "YES" branch is followed to step 808, where the ECE utility 100 calculates the percent tint that the object color is of the key color. The percent tint is calculated by averaging the four primary ratios calculated in step 802. Thus, the percent tint is given by the formula:

% tint=$(R_{cyan}+R_{magenta}+R_{yellow}+R_{black})/4$

Lastly, step 808 is followed by the "RETURN" step, which returns the routine back to step 610 in FIG. 6. However, if only one of the differences is greater than the predefined threshold, the object color is determined not to be a tint of the key color and the "NO" branch is followed directly to the "RETURN" step.

The present invention thus provides a method for color separating an image in an EPS file, containing an arbitrary number of objects and associated object colors, so that each object color may be mapped to an appropriate spot color partition for use in preparing press-ready spot color plates.

It should be understood that the foregoing pertains only to the preferred embodiments of the present invention, and that numerous changes may be made to the embodiments described herein without departing from the spirit and scope of the invention.

The invention claimed is:

1. A method for color separating a plurality of objects in an image to a plurality of partitions, each partition corresponding to a printing color, the image defined within an electronic file comprising a header portion and a body portion, and each object having an object color defined by a plurality of colorimetric values, comprising the steps of:
   determining whether at least one named color appears in the header portion,
   if at least one named color appears in the header portion and the named color is a spot color, replacing a plurality of colorimetric values associated with a key color with the plurality of colorimetric values associated with the named color,
   if no named color appears in the header portion, replacing the colorimetric values associated with the key color with the colorimetric values associated with the spot color;
   retrieving at least one object and the associated object color,
   determining whether the object color is a tint of the key color;
   in response to determining that the object color is a tint of the key color, mapping the object associated with the key color to a first partition; and
   in response to determining that the object color is not a tint of the key color, knocking out the object on the first partition and mapping the object to a second partition.

2. The method of claim 1, wherein the electronic file is an encapsulated POSTSCRIPT file.

3. The method of claim 1, further comprising the steps of printing copies of the image based on the first and second partitions.

4. The method of claim 1, further comprising the steps of:
   creating printing plates based on the first and second partitions; and
   printing copies of the image using the printing plates.

5. An apparatus operable for carrying out the steps of the method of claim 1.

6. A computer-readable storage device storing a set of computer-executable instructions for performing the method of claim 1.

7. The method of claim 1, wherein the colorimetric values consist essentially of RGB values.

8. The method of claim 7, wherein the step of determining whether the object color is a tint of the key color, comprises the steps of:
   calculating the ratios of each of the R, G, and B calorimetric values associated with the object color to each of the R, G, and B calorimetric values associated with the key color;
   determining whether the difference between each ratio is less than a predefined threshold value;
   if the difference between each ratio is less than a predefined threshold value, calculating a percent tint by averaging the color value ratios.

9. The method of claim 1, wherein the calorimetric values consist essentially of RGB and CMYK values.

10. The method of claim 9, wherein the step of determining whether the object color is a tint of the key color, comprises the steps of:
    calculating the ratios of each of the C, M, Y, and K colorimetric values of the object color to each of the C, M, Y, and K colorimetric values associated with the key color;
    determining whether the difference between each ratio is less than a predefined threshold value;
    if the difference between each ratio is less than a predefined threshold value, calculating a percent tint by averaging the color value ratios.

11. The method of claim 10, further comprising the steps of:
    generating a POSTSCRIPT prologue code to set a plurality of color variables having initial values to the key calorimetric values;
    transmitting the prologue code to the output device;
    transmitting the electronic file to the output device;
    generating a POSTSCRIPT epilogue code to set the plurality of color variables to their initial value; and
    transmitting the POSTSCRIPT epilogue code to the output device.

12. The method of claim 1, wherein the step of determining whether at least one named color appears in the header portion, further comprises the steps of:
    performing an intelligent name matching sequence to determine whether the named color matches the spot color; and
    if the named color matches the spot color, replacing the calorimetric values associated with the key color with the calorimetric values associated with the named color.

13. The method of claim 12, wherein the step of performing an intelligent name matching technique comprises the steps of:
    determining whether the named color contains a suffix;
    if the named color contains a suffix;
    stripping the suffix from the named color; and
    determining whether the stripped named color matches the spot color;
    if the stripped named color matches the spot color, replacing the colorimetric values associated with the key color with the calorimetric values associated with the stripped named color; and
    if the stripped named color does not match the spot color, replacing the colorimetric values associated with the key color with the colorimetric values associated with the spot color.

14. A method for color separating a plurality of objects in an image to a plurality of partitions, each partition corresponding to a printing color, the image defined within an encapsulated POSTSCRIPT file comprising a header portion and a body portion, and each object having an object color defined by a plurality of colorimetric values, comprising the steps of:
    determining whether at least one named color appears in the header portion, if at least one named color appears in the header portion and the named color is a spot color, replacing a plurality of calorimetric values associated with a key color with the plurality of calorimetric values associated with the named color, if no named color appears in the header portion, replacing the plurality of colorimetric values associated with the key color with the plurality of colorimetric values associated with the spot color;

generating a prologue POSTSCRIPT code to perform a third sequence comprising the steps of setting a plurality of color variables having initial values to the plurality of colorimetric values associated with the key color;

determining whether the object color is a tint of the key color;

if the object color is a tint of the key color, mapping the object associated with the key color to a first partition; and if the object color is not a tint of the key color, knocking out the object on the first plate and mapping the object to a second partition;

transmitting the prologue code to the output device;

transmitting the EPS file to the output device;

generating an epilogue POSTSCRIPT code to set the plurality of color variables to their initial value; and transmitting the POSTSCRIPT epilogue code to the output device.

15. The method of claim 14, further comprising the steps of printing copies of the image based on the first and second partitions.

16. The method of claim 14, further comprising the steps of:

creating printing plates based on the first and second partitions; and printing copies of the image using the printing plates.

17. The method of claim 14, wherein the step of determining whether at least one named color appears in the header portion, further comprises the steps of:

performing an intelligent name matching sequence to determine whether the named color matches the spot color;

if the named color matches the spot color, setting the colorimetric values associated with the key color to the calorimetric values associated with the named color; and if the named color does not match the spot color, performing an intelligent matching technique.

18. The method of claim 17, wherein the step of performing an intelligent name matching technique, comprises the steps of:

determining whether the named color contains a suffix;

if the named color contains a suffix;

stripping the suffix from the named color; and determining whether the stripped named color matches the spot color;

if the stripped named color matches the spot color, replacing the plurality of colorimetric values associated with the key color with the plurality of colorimetric values associated with the stripped named color; and if the stripped named color does not match the spot color, replacing the plurality of colorimetric values associated with the key color with the plurality calorimetric values associated with the spot color.

19. The method of claim 14, wherein the colorimetric values consist essentially of RGB values.

20. The method of claim 19, wherein the step of determining whether the object color is a tint of the key color, comprises the steps of:

calculating the ratios of each of the R, G, and B calorimetric values associated with the object color to each of the R, G, and B calorimetric values associated with the key color;

determining whether the difference between each ratio is less than a predefined threshold value;

if the difference between each ratio is less than a predefined threshold value, calculating a percent tint by averaging the color value ratios.

21. The method of claim 14, wherein the calorimetric values consist essentially of RGB and CMYK values.

22. The method of claim 21, wherein the step of determining whether the object color is a tint of the key color, comprises the steps of:

calculating the ratios of each of the C, M, Y, and K calorimetric values of the object color to each of the C, M, Y, and K colorimetric values associated with the key color;

determining whether the difference between each ratio is less than a predefined threshold value;

if the difference between each ratio is less than a predefined threshold value, calculating a percent tint by averaging the color value ratios.

23. A method for color separating a plurality of objects in an image to a plurality of partitions, each partition corresponding to a printing color, the image defined within an encapsulated POSTSCRIPT file comprising a header portion and a body portion, and each object having an object color defined by a plurality of calorimetric values, comprising the steps of:

determining whether at least one named color appears in the header portion, comprising the steps of if at least one named color appears in the header, the object color is a named color; performing an intelligent name matching sequence to determine whether the named color matches the spot color;

if the named color matches the spot color, replacing the plurality of colorimetric values associated with the key color with the plurality of calorimetric values associated with the named color; and if the named color does not match the spot color, performing an intelligent matching technique;

generating a prologue POSTSCRIPT code to perform a third sequence comprising the steps of setting a plurality of color variables having initial values to the plurality of calorimetric values associated with the key color;

determining whether the object color is a tint of the key color comprising the steps of;

calculating the ratios of each of the R, G, and B calorimetric values associated with the object color to each of the R, G, and B colorimetric values associated with the key color;

determining whether the difference between each ratio is less than a predefined threshold value;

if the difference between each ratio is less than a predefined threshold value, calculating a percent tint by averaging of the color value ratios;

if the object color is a tint of the key color, mapping the object associated with the key color to a first partition; and if the object color is not a tint of the key color, knocking out the object on the first plate and mapping the object to a second partition;

transmitting the prologue code to the output device;

transmitting the EPS to the output device;

generating an epilogue POSTSCRIPT code to set the plurality of color variables to their initial value; and transmitting the POSTSCRIPT epilogue code to the output device.

24. The method of claim 23, wherein the step of performing an intelligent name matching technique, comprises the steps of:

determining whether the named color contains a suffix;

if the named color contains a suffix;

stripping the suffix from the named color, and determining whether the stripped named color matches the spot color;

if the stripped named color matches the spot color, replacing the plurality of colorimetric values associated with the key color with the plurality of calorimetric values associated with the stripped named color; and if the stripped named color does not match the spot color, replacing the plurality of colorimetric values associated with the key color with the plurality of calorimetric values associated with the spot color.

* * * * *